United States Patent Office 3,462,533
Patented Aug. 19, 1969

3,462,533
METHOD FOR PROTECTING AGAINST LIVER DAMAGE USING AMINOACETO-NITRILE DERIVATIVES
Tsutomu Irikura, Keigo Nishino, and Seigo Suzue, Tokyo, Keiichi Ushiyama, Saitama-ken, Hirotaka Shinoda, Kawaguchi-shi, and Yoshinori Hasegawa, Tokyo, Japan, assignors to Kyorin Seiyaku Kabushiki Kaisha, Tokyo, Japan
No Drawing. Filed June 17, 1966, Ser. No. 558,281
Int. Cl. A61k 27/00
U.S. Cl. 424—304    4 Claims

ABSTRACT OF THE DISCLOSURE

A method of protecting the liver against the liver damaging action of carbon tetrachloride by administering to the exposed individual a member selected from the group consisting of compounds of the formula

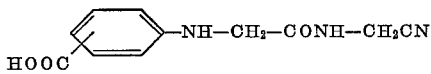

and the sodium salt, potassium salt, lithium salt, calcium salt, magnesium salt, amine salt, and pyridinium salt thereof.

---

This invention relates to novel compounds which are expressed by the following general formula:

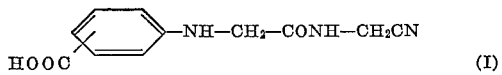

wherein the carboxyl group is in the o-, m- or p-position of the benzene ring.

Aminoacetonitrile is known to prevent liver damage caused by liver-damaging substances such as carbon tetrachloride, bromobenzene, thioacetamide, etc. Its use therapeutically is, however, effectively excluded because of the harmful pharmacological side effects bound up with such use.

According to the present invention, the compounds I are useful to achieve the desired liver protecting action against carbon tetrachloride and the like, while being free of the aforesaid harmful side effects. Furthermore, the use of the compounds I, as liver protecting agents, is not accompanied—as is sometimes the case with other substances used for the said purpose—by the appearance of lathyrism, especially bone lathyrism. This improvement, according to the present invention, appears to be ascribable to the fact that the amino acid moiety of the compounds I contains not naturally occurring amino and carboxyl groups.

The improved action vis-a-vis for example carbon tetrachloride is demonstrated in the following table, by way of illustration, by the effect on liver function achieved in the rat with e.g. N-(N-(p-carboxyphenyl)-glycyl)amino-acetonitrile.

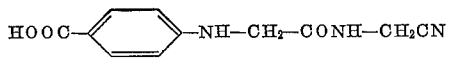

It is seen from the foregoing results that the compound Ia of this invention reduces the escape of liver enzymes into the blood, as compared with carbon tetrachloride, hence protects against liver trouble due to the latter. Still better is the fact that there is observed no or only such minimal lathyrism as can therapeutically be ignored.

Essentially analogous effects are observed with the corresponding o- and m-substituted analogs of compound Ia. The compounds of this invention can best be prepared by the process of the following general reaction scheme:

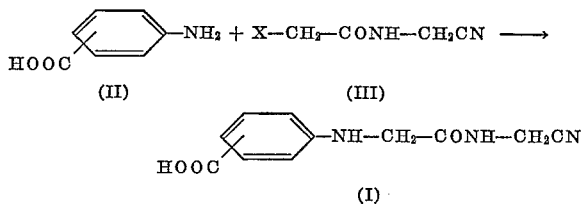

wherein X indicates a halogen atom. In other words, they are prepared by the reaction of amino acid (II) with N-(halogenacetyl)aminoacetonitrile (III). Instead of the free carboxy compound II, use may also be made of the alkali metal salts (e.g. sodium salts, potassium salts, lithium salts, etc.), alkaline earth metal salts (e.g. calcium salts magnesium salts, etc.) or salts with organic bases (e.g. amine salts, pyridinium salts, etc.), whereby the corresponding salts of compound I are obtained. Alkali metal salt of the amino acid is preferably used instead of free acid. In case the free acid is used, the presence of basic substances such as, for example, alkali metal hydroxide, alkali metal carbonate, alkali metal oxide, tertiary amine, etc., is preferred, a weakly alkaline substance, such as magnesium oxide for example, being the best. Water is the best solvent, but alcohols and pyridine can also be employed.

An effective dose of a compound I or pharmaceutically acceptable salt thereof, is administered, e.g. orally or by injection (intravenous, intramuscular, subcutaneous) in an amount of about 600 mg. to about 1200 mg. per day, and is repeated as required depending upon frequency and extent of exposure to liver damaging agents.

The following examples are shown for the purpose of illustration.

EXAMPLE 1

N-(N-(p-carboxyphenyl)glycyl)aminoacetonitrile 13.7 grams of p-aminobenzoic acid, 13.2 grams of chloroacetylaminoacetonitrile and 2 grams of magnesium oxide were suspended in 130 milliliters of water. The mixture was gently refluxed, became clear in a short time and crystals separated out in about one hour. After being heated for two hours, the mixture was cooled to room temperature (about 25°) and the crystals were filtered off. Recrystallization from a large amount of hot water gave 9.7 grams of white lamella crystals having a melting point of 214°–217° C.

*Analysis.*—Calcd. C, 56.65; H, 4.75; N, 18.02. Found: C, 56.55; H, 4.58; N, 17.85.

TABLE

| Group | Blood serum GOT [1] | Ratio (percent) | Number of rats | Blood serum GPT [2] | Ratio (percent) | Number of rats |
|---|---|---|---|---|---|---|
| Carbon tetrachloride administered | 25,000 | 100 | 2 | 35,300 | 100 | 2 |
| Compound Ia of this invention administered: | | | | | | |
| 50 mg./kg | 4,133 | 16.4 | 3 | 6,067 | 17.1 | 3 |
| 100 mg./kg | 3,400 | 13.0 | 3 | 9,600 | 27 | 3 |
| 200 mg./kg | 2,600 | 10.4 | 3 | 7,400 | 21 | 3 |

[1] Blood serum GOT means glutamic oxalo-transaminase in blood serum.
[2] Blood serum GPT means glutamic pyruvic transaminase in blood serum.

EXAMPLE 2

N-(N-(o-carboxyphenyl)glycyl)aminoacetonitrile 1.3 grams of anthranilic acid, 1.3 grams of chloroacetyl-aminoacetonitrile and 0.2 gram of magnesium oxide were reacted in 13 milliliters of water for two hours at 100° C. White needles, which separated on cooling, were filtered off. Recrystallization from hot water gave 0.9 gram of white needle crystals of M.P. 210–211° C.

EXAMPLE 3

N-(N-(m-carboxyphenyl)glycyl)aminoacetonitrile

A suspension of chloroacetyl-aminoacetonitrile (1.3 grams), MgO (0.2 gram), and m-aminobenzoic acid (1.3 grams) in $H_2O$ (13 milliliters) was refluxed with stirring for 4 hours. The reaction mixture was cooled, and the separated crystalline solid was collected by filtration, washed with $H_2O$ to give 1.0 gram of crystals, which were recrystallized from $H_2O$ or ethanol to give colorless needles, M.P. 174–176° C.

*Analysis.*—Calcd. $C_{11}H_{11}O_3N_3$: C, 56.65; H, 4.75; N, 18.02. Found: C, 56.16; H, 5.01; N, 17.79.

Having thus disclosed the invention what is claimed is:

1. The method of protecting the liver against the liver damaging action of carbon tetrachloride which comprises administering to the individual exposed to the aforesaid liver damaging action an effective dose of a member selected from the group consisting of compounds of the formula

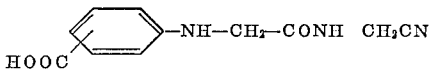

and the sodium salt, potassium salt, lithium salt, calcium salt, magnesium salt, amine salt and pyridinium salt thereof.

2. A method according to claim 1 wherein the compound administered is N-(N-(p-carboxyphenyl)glycyl)aminoacetonitrile.

3. A method according to claim 1, wherein the compound administered is N-(N-(o-carboxyphenyl)glycyl)aminoacetonitrile.

4. A method according to claim 1, wherein the compound administered is N-(N-(m-carboxyphenyl)glycyl)aminoacetonitrile.

References Cited

UNITED STATES PATENTS

| | | | |
|---|---|---|---|
| 3,141,018 | 7/1964 | Straley et al. | 260—247.2 |
| 3,185,707 | 5/1965 | Meschino | 260—340.5 |

ALBERT T. MEYERS, Primary Examiner

D. M. STEPHENS, Assistant Examiner

U.S. Cl. X.R.

424—263